United States Patent
Li et al.

(10) Patent No.: US 11,956,839 B2
(45) Date of Patent: Apr. 9, 2024

(54) METHOD FOR TRANSMITTING INFORMATION FOR VEHICLES, SYSTEM AND NON-TRANSITORY COMPUTER-READABLE STORAGE MEDIUM THEREOF

(71) Applicant: BEIJING XIAOMI MOBILE SOFTWARE CO., LTD., Beijing (CN)

(72) Inventors: Yuanyuan Li, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 225 days.

(21) Appl. No.: 17/260,978

(22) PCT Filed: Jul. 20, 2018

(86) PCT No.: PCT/CN2018/096491
§ 371 (c)(1),
(2) Date: Jan. 15, 2021

(87) PCT Pub. No.: WO2020/014972
PCT Pub. Date: Jan. 23, 2020

(65) Prior Publication Data
US 2021/0266994 A1 Aug. 26, 2021

(51) Int. Cl.
*H04W 76/14* (2018.01)
*H04L 1/00* (2006.01)
(Continued)

(52) U.S. Cl.
CPC ........... *H04W 76/14* (2018.02); *H04L 1/0003* (2013.01); *H04W 4/40* (2018.02); *H04W 24/10* (2013.01)

(58) Field of Classification Search
CPC ....... H04W 76/14; H04W 4/40; H04W 24/10; H04L 1/0003
See application file for complete search history.

(56) References Cited

U.S. PATENT DOCUMENTS

2017/0188391 A1 6/2017 Rajagopal et al.
2018/0242190 A1 8/2018 Khoryaev et al.
(Continued)

FOREIGN PATENT DOCUMENTS

CN 107925906 A 4/2018
WO 2017113207 A1 7/2017
(Continued)

OTHER PUBLICATIONS

Supplementary European Search Report in the European application No. 18926882.4, dated Jan. 26, 2022, (6 pages).
(Continued)

*Primary Examiner* — Sharmin Chowdhury
*Assistant Examiner* — Angelie T Ngo
(74) *Attorney, Agent, or Firm* — Arch & Lake LLP (57) ABSTRACT

The present disclosure relates to an information transmitting method and apparatus, and a terminal and a storage medium. The method includes: a first terminal receives target information sent by a second terminal on a target channel through a direct-connect communication interface for transmitting a V2X service; the first terminal obtains measurement information corresponding to the target information, wherein the measurement information comprises the measurement position and a measurement value; the measurement position is used to indicate the time-frequency position occupied by the target information, and the measurement value is used to indicate the channel quality of the target channel; and the first terminal sends the measurement information to the second terminal.

20 Claims, 5 Drawing Sheets

(51) Int. Cl.
*H04W 4/40* (2018.01)
*H04W 24/10* (2009.01)

(56) References Cited

U.S. PATENT DOCUMENTS

| | | | | |
|---|---|---|---|---|
| 2019/0110325 A1* | 4/2019 | Gulati | ............... | H04L 5/0053 |
| 2019/0356451 A1* | 11/2019 | Zhang | ............... | H04B 17/327 |
| 2019/0364590 A1* | 11/2019 | Sartori | ............... | H04W 72/14 |
| 2019/0373637 A1 | 12/2019 | Lee | | |
| 2020/0022013 A1* | 1/2020 | Nguyen | ............... | H04L 1/0076 |
| 2020/0275458 A1* | 8/2020 | Khoryaev | ............ | H04W 72/12 |
| 2020/0296796 A1* | 9/2020 | Uchiyama | ............ | H04L 1/1861 |

FOREIGN PATENT DOCUMENTS

| | | | | | |
|---|---|---|---|---|---|
| WO | WO-2017175819 A1 * | 10/2017 | | ........... | H04L 1/0005 |
| WO | 2018084608 A2 | 5/2018 | | | |
| WO | 2018131947 A1 | 7/2018 | | | |

OTHER PUBLICATIONS

International Search Report issued to PCT/CN2018/096491 dated Apr. 4, 2019 with English translation, (4p).

English translation of the Written Opinion of the International Search Authority in the international application No. PCT/CN2018/096491, dated Apr. 4, 2019, (3p).

First Office Action of the Chinese Application No. 201880000861.6, dated Oct. 23, 2019 with English translation, (14p).

Second Office Action of the Chinese Application No. 201880000861.6, dated Apr. 20, 2020 with English translation, (11p).

Third Office Action of the Chinese Application No. 201880000861.6, dated Jul. 20, 2020 with English translation, (14p).

CATT, "Discussion on carrier aggregation for mode 4 in V2X Phase 2", 3GPP TSG RAN WG1 Meeting #90 R1-1712339, Prague, Czechia, Aug. 21-25, 2017, Discussion and Decision, (6p).

* cited by examiner

METHOD FOR TRANSMITTING INFORMATION FOR VEHICLES, SYSTEM AND NON-TRANSITORY COMPUTER-READABLE STORAGE MEDIUM THEREOF

CROSS-REFERENCE TO RELATED APPLICATIONS

This application is a national phase application based on PCT/CN2018/096491, filed on Jul. 20, 2018, the entire content of which is incorporated herein by reference for all purposes.

TECHNICAL FIELD

The present disclosure relates to the field of communication technology, and in particular, to a method and an apparatus for transmitting information, a terminal and a storage medium.

BACKGROUND

Vehicle to Everything (V2X) technology, also known as wireless communication technology for vehicles, is a new generation of information communication technology that connects vehicles with everything. The direct interconnection communication interface between terminals that is involved in the V2X technology is a PC5 interface.

At present, how to ensure the transmission quality of the communication link established based on the above direct interconnection communication interface is an urgent problem to be solved for the V2X system.

SUMMARY

The present disclosure provides a method and an apparatus for transmitting information, a terminal and a storage medium.

According to a first aspect of the present disclosure, a method for transmitting information is provided. The method includes the following operations.

A first terminal receives, through a direct interconnection communication interface for transmitting V2X services, target information sent by a second terminal on a target channel.

The first terminal obtains measurement information corresponding to the target information. The measurement information includes a measurement position and one or more measurement values. The measurement position is used to indicate a time-frequency position occupied by the target information, and the one or more measurement values are used to indicate channel quality of the target channel.

The first terminal transmits the measurement information to the second terminal.

According to a second aspect of the present disclosure, an apparatus for transmitting information, which is applied in a first terminal is provided. The apparatus includes an information receiving module, an information acquiring module and an information transmitting module. The information receiving module is configured to receive, through a direct interconnection communication interface for transmitting V2X services, target information sent by a second terminal on a target channel.

The information acquiring module is configured to obtain measurement information corresponding to the target information. The measurement information includes a measurement position and one or more measurement values, the measurement position is used to indicate a time-frequency position occupied by the target information, and the one or more measurement values are used to indicate channel quality of the target channel.

The information sending module is configured to transmit the measurement information to the second terminal.

According to a third aspect of the present disclosure, a terminal is provided. The terminal includes a processor and a memory for storing instructions executable by the processor.

The processor is configured to receive, through a direct interconnection communication interface for transmitting V2X services, target information sent by a second terminal on a target channel. The processor is further configured to obtain measurement information corresponding to the target information. The measurement information includes a measurement position and one or more measurement values, the measurement position is used to indicate a time-frequency position occupied by the target information, and the one or more measurement values is used to indicate channel quality of the target channel.

The processor is further configured to transmit the measurement information to the second terminal.

According to a fourth aspect of the present disclosure, a non-transitory computer-readable storage medium, in which computer programs are stored, is provided. When the computer programs are executed by a processor, steps of the method described in the first aspect are implemented.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

The network architecture and services scenarios described in the embodiments of the present disclosure are intended to illustrate the technical solutions of the embodiments of the present disclosure more clearly, and do not constitute a limitation to the technical solutions provided by the embodiments of the present disclosure. Those of ordinary skill in the art will know that with the evolution of network architecture and the emergence of new business scenarios, the technical solutions provided by the embodiments of the present disclosure are also applicable to similar technical problems.

Figure 1:
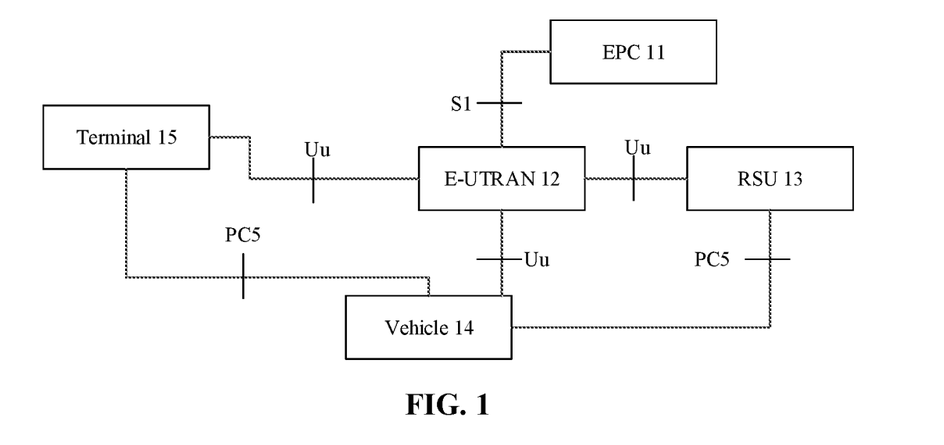
FIG. 1 is a schematic diagram of a network architecture to which the embodiments of the present disclosure may be applicable.

FIG. 1 shows a schematic diagram of a network architecture to which the embodiments of the present disclosure may be applicable. This network architecture only takes the Long Term Evolution (LTE) system as an example. The network architecture may include: Evolved Packet Core (EPC) 11, Evolved Universal Mobile Telecommunications System (UMTS) Terrestrial Radio Access Network (E-UTRAN) 12, Road Side Unit (RSU) 13, vehicle 14 and terminal 15.

EPC 11 is the core network of the LTE system. The core network includes several pieces of core network equipment. The functions of the core network equipment mainly are providing user connections, management for users and completing the bearing for services, and providing, as the bearing network, an interface to the external network. For example, EPC 11 includes Mobility Management Entity (MME), Serving Gateway (S-GW), and PDN Gateway (P-GW).

E-UTRAN 12 is the access network of the LTE system. The access network includes several pieces of access network equipment. The access network equipment may be a Base Station (BS), which is a device deployed in an access network and used to provide a wireless communication function for the terminal 15. The base station may include various types of macro base stations, micro base stations, relay stations, access points, and the like. In systems using different wireless access technologies, the names of devices with base station functions may be different. For example, in LTE systems, they are called evolved NodeB (eNB or eNodeB). In 3G communication systems, they are called Node B, and the like.

The terminal 15 may include various handheld devices with wireless communication functions, vehicle-mounted devices, wearable devices, computing devices or other processing devices connected to a wireless modem, as well as various types of User Equipment (UE), Mobile Stations (MS), terminal device, and the like. For ease of description, the devices mentioned above are collectively referred to as terminals.

The access network equipment and the core network equipment communicate with each other through a certain air interface technology, such as an S1 interface. The access network equipment and the terminal 15 also communicate with each other through a certain air interface technology, such as a Uu interface.

The RSU 13 may include a microwave reading and writing device and a controller. The RSU 13 is used to receive the information reported by the vehicle 14 and deliver road traffic information to the vehicle 14. The RSU 13 has capabilities of data storage and processing, and can quickly and accurately detect traffic information such as road conditions and driving, and process the traffic information before transmitting it to the vehicle 14. The RSU 13 and the access network device can communicate with each other through a certain air interface technology, such as a Uu interface.

The vehicle 14 may be an autonomous vehicle or a non-autonomous vehicle. The vehicle 14 is equipped with a vehicle-mounted communication device. The communication between the vehicle 14 and other vehicles, the terminal 15 or other equipment is implemented through the vehicle-mounted communication device, such as an RSU 13. The vehicle-mounted communication device may be a device integrated in the Telematics BOX (T-BOX), or a device separated from the vehicle. Further, the vehicle-mounted communication device may be installed in the vehicle 14 before the vehicle 14 leaves the factory, or may be installed in the vehicle 14 after the vehicle 14 leaves the factory. The vehicle-mounted communication device of the vehicle 14 and the terminal 15 may communicate with each other through a direct interconnection communication interface (such as a PC5 interface). For example, the terminal 15 sends its own location information to the vehicle 14 through the PC5 interface. The vehicle-mounted communication device of the vehicle 14 and the RSU 13 may communicate with each other through a direct interconnection communication interface (such as a PC5 interface). For example, the RSU 13 sends traffic information of a distant road to the vehicle 14 through the PC5 interface. Further, the vehicle-mounted communication device of the vehicle 14 and the access network equipment (for example, the eNB of the LTE system) may also communicate with each other through a certain air interface technology, such as a Uu interface.

The network architecture shown in FIG. 1 may implement scenarios of V2X service. The network architecture may also include devices such as V2X application servers, V2X control function nodes, and the like, which are not limited in the embodiments of the present disclosure.

It should be noted that, in the network architecture shown in FIG. 1, only the LTE system is taken as an example for description. The technical solutions described in the present disclosure may be applicable for LTE systems or other wireless communication systems using various wireless access technologies, such as systems adopting access technology like Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA). Further, the technical solutions may also be applicable for the subsequent evolution systems of the LTE system, such as a next-generation network system, i.e., a 5th Generation (5G) system and the like. In addition, in the embodiments of the present disclosure, the terms "network" and "system" are often used interchangeably, and those skilled in the art can understand the meanings of them.

Figure 2:
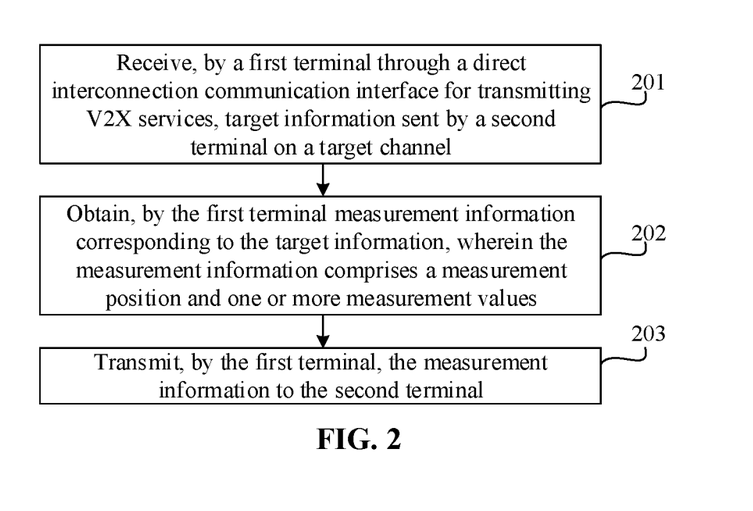
FIG. 2 is a flow chart showing a method for transmitting information according to an embodiment.

FIG. 2 is a flow chart showing a method for transmitting information according to an embodiment. The method may be applied to the network architecture shown in FIG. 1. The method may include the following steps.

At step 201, the target information sent by a second terminal on a target channel is received by a first terminal through a direct interconnection communication interface for transmitting V2X services.

The first terminal refers to a terminal device that communicates with at least one other device through a direct interconnection communication interface in a V2X service scenario. For example, the first terminal may be the vehicle-mounted communication device of the vehicle 14 in the network architecture described in the embodiment in FIG. 1, or may be the terminal 15 in the network architecture described in the embodiment in FIG. 1, or may be the RSU 13 in the network architecture described in the embodiment in FIG. 1, or may be other network devices capable of communicating based on the direct interconnection communication interface in the V2X service scenario. It is not limited in the embodiments of the present disclosure. In one or more embodiments, the above mentioned direct interconnection communication interface is a PC5 interface.

The second terminal refers to a terminal device that communicates with the first terminal through the direct interconnection communication interface in a V2X service scenario. Similarly, the second terminal may be the vehicle-mounted communication device, terminal 15, RSU 13, or other network equipment of the vehicle 14 in the network architecture described in the embodiment of FIG. 1. It is not limited in the embodiments of the present disclosure.

In one or more embodiments, the above target channel is a physical channel. The target information may be control signalling, service data, or any other information sent by the second terminal through the above mentioned direct interconnection communication interface. It is not limited in the embodiments of the present disclosure. Further, in the embodiments of the present disclosure, the manner in which the second terminal sends the target information is not limited, and it may be sent in a broadcast manner, or may be sent in a point-to-point manner.

At step 202, the first terminal obtains measurement information corresponding to the target information, and the measurement information includes a measurement location and one or more measurement values.

In the embodiments of the present disclosure, the measurement position is used to indicate a time-frequency position occupied by the target information, and the measurement values are used to indicate the channel quality of the target channel.

The measurement position is used to indicate a time domain position and/or a frequency domain position occupied by the target information. In one or more embodiments, the measurement location includes, but is not limited to, at least one of followings: frame identifier, sub-frame identifier, time slot identifier, symbol identifier, subcarrier identifier, Resource Block (RB) identifier, or resource element (RE) identifier. The frame identifier is used to indicate the position of the frame occupied by the target information, the sub-frame identifier is used to indicate the position of the sub-frame occupied by the target information, the time slot identifier is used to indicate the position of the time slot occupied by the target information, and the symbol identifier is used to indicates the position of the symbol occupied by the target information, the subcarrier identifier is used to indicate the position of the subcarrier occupied by the target information, the RB identifier is used to indicate the position of the RB occupied by the target information, and the RE identifier is used to indicate the position of the RE occupied by the target information. Which parameters are carried in the measurement location may be pre-defined by a protocol.

The one or more measurement values are used to indicate the channel quality of the target physical channel used to send the target information. The one or more measurement values include, but are not limited to, at least one of the following: Channel Quality Indicator (CQI), rank indication (RI), Precoding Matrix Indicator (PMI), or Reference Signal Receiving Power (RSRP). Which parameter is specifically carried in the one or more measured values may be pre-defined by the protocol.

After receiving the target information, the first terminal obtains the one or more measurement values, and then generates the measurement information.

In one or more embodiments, a statistical granularity or statistical unit of the measurement information in the time domain includes, but is not limited to, any one of the following: at least one frame, at least one sub-frame, at least one slot, and at least one symbol. The statistical granularity or statistical unit may be pre-defined by the protocol, or may be indicated by the network side device to the first terminal.

In one or more embodiments, after receiving the target information sent by the second terminal, the first terminal may further perform the following steps. The first terminal detects whether the second terminal has passed a Physical Sidelink Control Channel (PSCCH) activation detection. If the second terminal has passed the PSCCH activation detection, the first terminal performs the above step 202. If the second terminal has not passed the PSCCH activation detection, the above step 202 is not performed, and the process may be ended. According to the above manner, the measurement information is collected only for the terminal passed the PSCCH activation detection, which is benefit to saving the processing overhead of the first terminal.

At step 203, the first terminal transmits measurement information to the second terminal.

Figure 3:
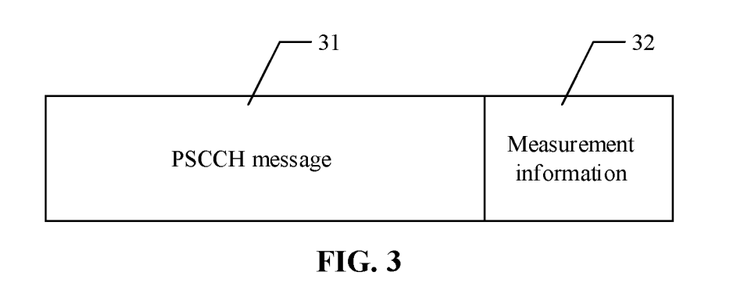
FIG. 3 is a schematic diagram exemplarily showing a message format.

In a possible implementation manner, the first terminal transmits a message to the second terminal through a PSCCH. The message carries the measurement information. PSCCH is used to carry SCI (Sidelink Control Information). As shown in FIG. 3, it shows exemplarily a schematic structural diagram of the message sent through the PSCCH. The message includes a first part 31 and a second part 32, where the first part 31 carries information (such as SCI) that needs to be sent on the PSCCH originally, and the second part 32 carries the measurement information.

Figure 4:
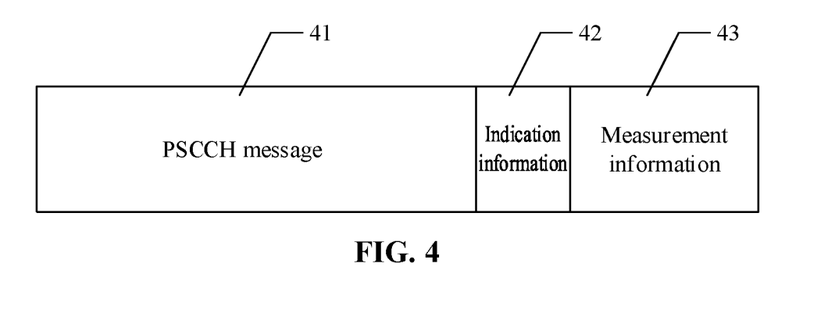
FIG. 4 is a schematic diagram exemplarily showing another message format.

In one or more embodiments, the message further includes a first indication information, and the first indication information is used to indicate that the message carries the measurement information. Further, if the message does not carry measurement information, the message may include second indication information. The second indication information is used to indicate that the measurement information is not carried in the message. In one or more embodiments, the first indication information is located before the measurement information. As shown in FIG. 4, it exemplarily shows another structural schematic diagram of the message sent through the PSCCH. The message includes a first part 41, a second part 42, and a third part 43. The first part 41 carries the information (such as SCI) that needs to be sent on the PSCCH originally, and the second part 42 carries the first indication information or the second indication information. In the case where the second part 42 carries the first indication information, the third part 43 carries measurement information. In one or more embodiments, the indication information used to indicate whether the measurement information is carried may be represented by using 1 bit. For example, 1 refers to the first indication information, which indicates that measurement information is carried. 0 refers to the second indication information, which indicates that no measurement information is carried.

In another possible embodiment, the first terminal transmits measurement information to the second terminal through a Physical Sidelink Shared Channel (PSSCH). PSSCH is used to carry the service data of the terminal.

Figure 5:
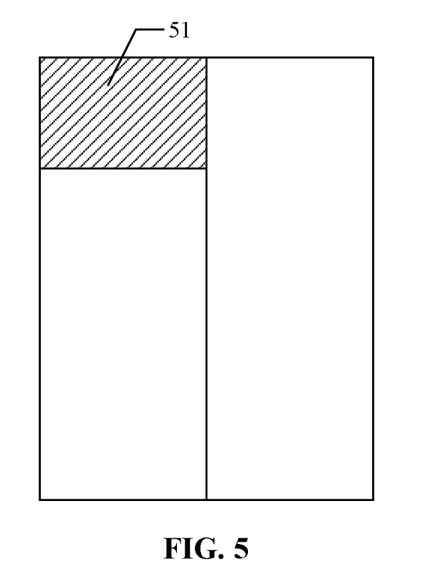
FIG. 5 is a schematic diagram exemplarily showing occupation of the video resource.

In one or more embodiments, the measurement information occupies at least one RE of the first symbol of the PSSCH; or the measurement information occupies m REs of first n symbols of the PSSCH, and both n and m are positive integers. With reference to FIG. 5, it exemplarily shows a schematic diagram of time-frequency resource occupation for transmitting measurement information on the PSSCH channel. In the figure, the horizontal direction represents the time domain, the vertical direction represents the frequency domain, and the shaded part 51 represents the time-frequency resource occupied by the measurement information.

Of course, the foregoing transmission of measurement information through PSCCH or PSSCH is only exemplary and explanatory. In other embodiments, other channels may also be used to send measurement information. For example, a dedicated channel for transmitting measurement information is pre-defined by the protocol, and the measurement information is transmitted through the dedicated channel.

In addition, the first terminal may directly transmit the message carrying the measurement information to the second terminal, or may forward the message carrying the measurement information to the second terminal through other devices (such as access network equipment or other terminals). In addition, the message sent by the first terminal may carry one piece of measurement information or multiple pieces of measurement information, such as it may include measurement information corresponding to the target information sent by the second terminal, and may further include the measurement information corresponding to the other information sent by the second terminal or other terminals. It is not limited in the embodiments of the present disclosure.

In conclusion, in the technical solutions provided by the embodiments of the present disclosure, after the first terminal receives, on the direct interconnection communication interface, the information sent by the second terminal, the measurement information corresponding to the information is acquired, and then the measurement information is sent to the second terminal. The measurement and feedback for the quality of the channel between terminals are implemented, and the improving of the transmission quality of the communication link established between the terminals based on the direct interconnection communication interface is reliably guaranteed.

In the following, with reference to FIG. 6, the flow of the method executed after the second terminal obtains the measurement information is introduced and explained.

At step 601, the second terminal obtains at least one piece of measurement information, and the measurement information includes a measurement location and one or more measurement values.

The introduction and description of the measurement location and the one or more measurement values can be found above, which is not described repeatedly herein.

Each piece of measurement information includes a set of corresponding measurement position and measurement value. The measurement value records the time-frequency position occupied by the measured information when the measured information is sent, and the measured value records the channel quality of the physical channel used when transmitting the foregoing measured information. The foregoing at least one piece of measurement information acquired by the second terminal may include measurement information recorded after measurement value collection is performed on the information sent by the second terminal, and may further include measurement information recorded after measurement value collection is performed on the information sent by other terminals except the second terminal.

In one or more embodiments, the second terminal receives the foregoing at least one piece of measurement information from at least one other terminal. In one or more embodiments, the second terminal receives the measurement information sent by the first terminal. In one or more embodiments, the second terminal obtains multiple pieces of measurement information, and the multiple pieces of measurement information may be shown in the following Table-1:

TABLE 1

| | |
|---|---|
| Measurement position 1 | Measurement values 1 |
| Measurement position 2 | Measurement values 2 |
| Measurement position 3 | Measurement values 2 |
| Measurement position 4 | Measurement values 4 |
| . . . | . . . |

At step 602, the second terminal obtains a target measurement value corresponding to the target measurement position from the foregoing at least one piece of measurement information.

The target measurement location refers to the measurement location corresponding to the target information sent by the second terminal. The target information refers to the information sent by the second terminal through the direct interconnection communication interface for transmitting the V2X service. The target information may be control signalling, service data, or any other information sent by the second terminal through the direct interconnection communication interface. It is not limited in the embodiments of the present disclosure. In addition, in the embodiments of the present disclosure, the manner in which the second terminal sends the target information is not limited. It may be sent in a broadcast manner, or may be sent in a point-to-point manner.

The second terminal may record the time-frequency position occupied by the target information sent by it, that is, the target measurement position. Then, after obtaining at least one piece of measurement information, the second terminal obtains the target measurement value corresponding to the target measurement position from the at least one piece of measurement information. For example, with reference to the Table-1, it is assumed that the time-frequency position, which is recorded by the second terminal, occupied by the target information sent by the second terminal is the same as the measurement position 2, the target measurement value obtained by the second terminal includes the measurement value 2.

In addition, since the target information sent by the second terminal may be received by one or more other terminals, each terminal that receives the target information may feed measurement information back to the second terminal. Therefore, the number of the target measurement values obtained by the second terminal may be one or multiple.

At step 603, the second terminal determines, according to the target measurement value, quality parameter of the target channel used for transmitting the target information.

The quality parameter of the target channel is used to indicate the channel quality of the target channel. After obtaining the target measurement value, the second terminal converts the target measurement value into equivalent quality parameter of the Additive White Gaussian Noise (AWGN) channel. In one or more embodiments, the quality parameter may be SNR or Signal to Interference plus Noise Ratio (SINR).

In an embodiment, if the second terminal obtains one target measurement value, the second terminal determines, according to the target measurement value, the quality parameter of the target channel used for transmitting the target information.

In another embodiment, if the second terminal obtains at least two target measurement values, the second terminal determines a comprehensive measurement value according to the at least two target measurement values, and then determines the quality parameter of the target channel used for transmitting the target information. The comprehensive measurement value represents the overall level of the at least two target measurement values.

In a possible embodiment, the second terminal determines, according to the at least two target measurement values, the threshold value that meets a pre-set condition as the comprehensive measurement value. The pre-set condition is that p % of the target measurement values are greater than the threshold value, and 1-p % of the target measurement values are less than the threshold value, and p is a pre-set constant. In the embodiments of the present disclosure, the value of p is not limited, for example, p may be 90, 80, or 70, and the like. In addition, the value of p may be pre-defined by the protocol, or determined by the second terminal itself, or notified to the second terminal by other devices. It is not limited in the embodiments of the present disclosure. In addition, when there are multiple threshold values that meet the foregoing pre-set condition, the second terminal may determine an average value of the multiple threshold values as the comprehensive measurement value.

In another possible embodiments, the second terminal calculates an average value of the at least two target measurement values, and determines the average value as a comprehensive measurement value.

Of course, only two methods for determining the comprehensive measurement value are exemplarily introduced above. It is not limited in the embodiments of the present disclosure that other methods may be used to determine the comprehensive measurement value. For example, the median value of the foregoing at least two target measurement values is determined as the comprehensive measurement value, or an average value of the maximum value and the minimum value of the foregoing at least two target measurement values is determined as a comprehensive measurement value, etc.

The second terminal converts the measured value (such as the target measurement value in the first example, or the comprehensive measurement value in the second example) into the target quality parameter, which may be implemented by using Exponential Effective SIR Mapping (EESM) Algorithm, which is not described repeatedly in the embodiment of the present disclosure.

At step 604, the second terminal determines, according to the quality parameter of the target channel, a maximum available Modulation and Coding Scheme (MCS) level corresponding to the target channel.

For each MCS level in different MCS levels, a correspondence between a set of quality parameters (SNR or SINR) and BLER may be predefined. BLER refers to the percentage of error blocks in all sent blocks. The correspondence may be obtained through simulation. The correspondence for each MCS level may be pre-stored in the second terminal. After acquiring the quality parameter of the target channel, the second terminal determines, according to the pre-stored correspondence for each MCS level, the maximum available MCS level corresponding to the target channel.

The maximum available MCS level corresponding to the target channel refers to the maximum value of the MCS level that can be used when transmitting information on the target channel.

In conclusion, in the technical solutions provided by the embodiments of the present disclosure, the target measurement value corresponding to the target measurement position is obtained from the measurement information by the second terminal, and the target measurement position refers to the measurement position corresponding to the target information sent by the second terminal. The second terminal determines the quality parameter of the target channel used for transmitting the target information according to the target measurement value, and then further determines the maximum available MCS level corresponding to the target channel according to the quality parameter of the target channel. The foregoing technical solutions implement the determination for the MCS level after the channel quality is evaluated, which avoids the problem of the loss of a wide range of information caused by that the MCS level selected, when the channel quality is not good is too large. It is beneficial to improving the reliability of information transmission.

Figure 6:
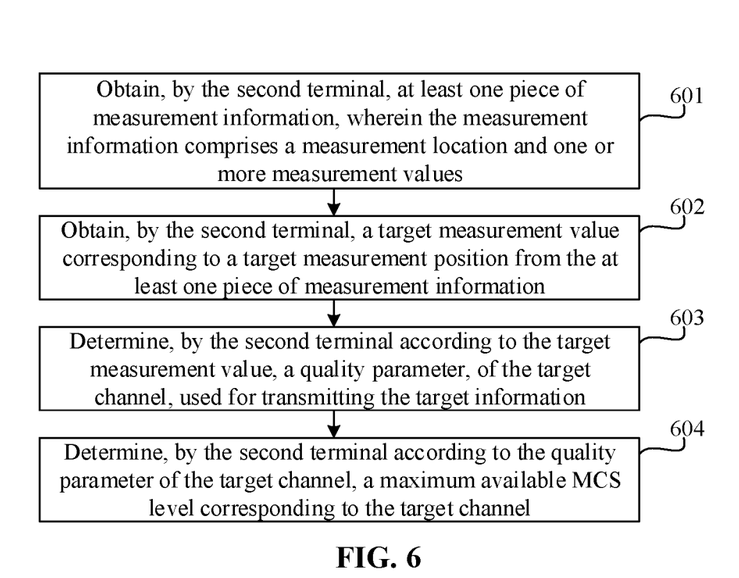
FIG. 6 is a flow chart showing a method after the terminal obtains measurement information.

In an embodiment provided based on the embodiment of FIG. 6, after the foregoing step 604, the following steps may be further included. If the second terminal obtains a maximum MCS level and a minimum MCS level of the geographic area where the second terminal is located, then the second terminal adjusts the maximum available MCS level according to the maximum MCS level, the minimum MCS level, and the maximum available MCS level determined in step 604.

In the embodiments of the present disclosure, the manner in which the second terminal obtains the maximum MCS level and the minimum MCS level of the geographic area where it is located is not limited. For example, the second terminal may receive notification information sent by the access network device, the notification information carrying the maximum MCS level and the minimum MCS level of the geographic area where the second terminal is located. The second terminal obtains the maximum MCS level and the minimum MCS level from the foregoing notification information. For another example, the storage device of the second terminal may pre-store the maximum MCS level and the minimum MCS level of the geographic area where it is located, and the second terminal may obtain the maximum MCS level and the minimum MCS level from the foregoing storage device.

If the maximum available MCS level before adjustment is greater than the minimum MCS level, the second terminal determines the smaller value of the maximum available MCS level before adjustment and the maximum MCS level as the adjusted maximum available MCS level; if the maximum available MCS level before adjustment is less than or equal to the minimum MCS level, the second terminal determines the minimum MCS level as the adjusted maximum available MCS level.

It is assumed that the maximum available MCS level before adjustment is $MCS_x$, the maximum MCS level of the geographic area where the second terminal is located is $MCS_{max}$, and the minimum MCS level is $MCS_{min}$.

If $MCS_x > MCS_{min}$, the maximum available MCS level of the second terminal on the target channel is min ($MCS_{max}$, $MCS_X$) and the minimum is $MCS_{min}$; where min ($MCS_{max}$, $MCS_X$) represents the smaller value of $MCS_{max}$ and $MCS_X$;

If $MCS_X \le MCS_{min}$, the available MCS level of the second terminal on the target channel is $MCS_{min}$.

In addition, if the second terminal does not obtain the maximum MCS level and the minimum MCS level of the geographic area where it is located, it is not necessary for the second terminal to adjust the maximum available MCS level determined in step 604.

In conclusion, in the technical solutions provided by the embodiments of the present disclosure, the maximum available MCS level determined in step 604 is adjusted by the second terminal according to the maximum MCS level and minimum MCS level of the geographic area where it is located, thereby ensuring that the finally determined MCS level meets the constraints of the geographic area where the second terminal is located.

In another embodiment provided based on the embodiment of FIG. 6 or the foregoing embodiments, after the foregoing step 604 or after adjusting the maximum available MCS level, the following steps may be further included.

1. The second terminal selects, according to the data volume of the information to be sent on the target channel, a transport block size (TBS) value, closest to the data volume of the information to be sent, within the range of the maximum available MCS level.

In one or more embodiments, the TBS value closest to the data volume of the information to be sent is the smallest value among the candidate TBS values that are not less than the data volume of the information to be sent.

2. The second terminal determines the number of physical bearers used for transmitting the information to be sent according to the foregoing TBS value.

In one or more embodiments, the second terminal determines the number of physical bearers used for transmitting the information to be sent may be implemented by any one of the following methods.

1. The second terminal selects the largest number of physical bearers from the number of at least two candidate physical bearers as the number of physical bearers used for transmitting information to be sent. In such a manner, the code rate may be reduced and the transmission reliability may be improved most.

2. The second terminal selects the smallest number of physical bearers from the number of at least two candidate physical bearers as the number of physical bearers used for transmitting information to be sent. In such a manner, the occupation for physical resources may be reduced and more users are allowed to be accommodated in the network.

In addition, the number of at least two candidate physical bearers may be determined by the second terminal according to the TBS value. In other possible embodiments, the second terminal may also select, from the number of at least two candidate physical bearers, other numbers except the largest and smallest number of physical bearers, as the number of physical bearers for transmitting the information to be sent. For example, a median value is selected as the number of physical bearers used for transmitting the information to be sent to achieve a compromise selection scheme.

In the following, an example is used to illustrate the technical solutions introduced above.

It is assumed that the second terminal is UE_A, and it receives measurement information sent by UE_B, UE_C, and UE_D. UE_A sends target information on a time-frequency resource with a frame number of 100 and a sub-frame number of 2. The measurement information sent by UE_B, UE_C, and UE_D all include the measurement values corresponding to the foregoing position, which are P_B, P_C, and P_D, respectively.

UE_A performs statistical processing on the three measurement values to obtain P_m, and converts P_m into the corresponding SNR for the AWGN channel. It is assumed that the corresponding SNR is SNR_m.

Figure 7:
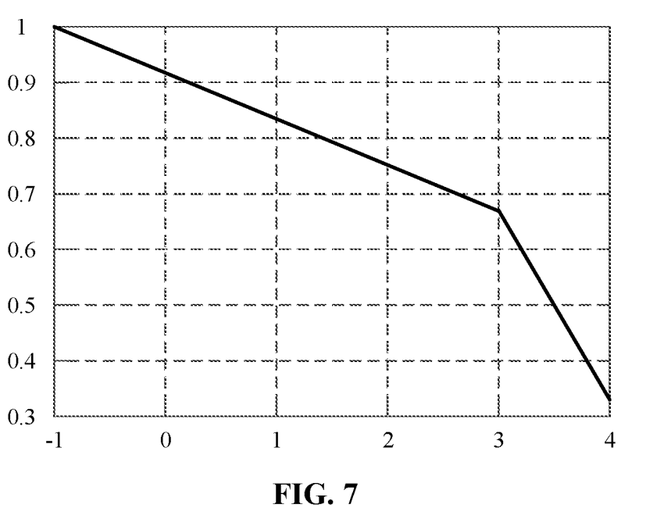
FIG. 7 is a schematic diagram exemplarily showing a CDF curve.

In a possible processing method, P_m=mean (P_B, P_C, P_D). That is, P_m is an average value of P_B, P_C, and P_D;

In another possible processing method, P_B, P_C, and P_D are sorted in a descending order, a CDF curve is drawn, and the abscissa value corresponding to a point having a ordinate value of 0.9 is found and taken as P_m. Assuming that P_B=0, P_C=4, and P_D=2, P_B, P_C, and P_D are sorted in a descending order, to be 4, 2, and 0. As shown in FIG. 7, the CDF curve is drawn. The position having the ordinate value of 0.9 has a corresponding abscissa value of 0.2. Therefore, 0.2 is determined as P_m.

Figure 8:
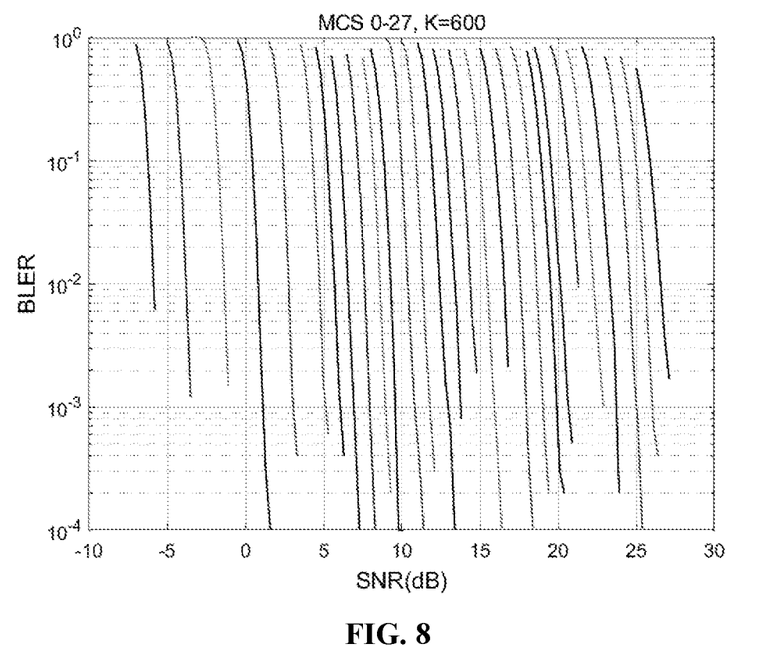
FIG. 8 is a schematic diagram exemplarily showing a corresponding curve between Signal-to-Noise Ratio (SNR) and block error rates (BLER).

UE_A looks up the corresponding curves of SNR and BLER on different MCS levels, and determines the maximum available MCS level that UE_A obtains according to the channel quality, and the maximum available MCS level is recorded as $MCS_X$. In some embodiments, the corresponding curves of the pre-stored SNR and BLER are shown in FIG. 8. It is assumed that the SNR_m obtained in the previous step equals 4 dB. According to the corresponding curves shown in FIG. 8, when the BLER meets the requirement, if the requirement is defined as 0.1, then the first 4 MCS levels meet the requirements, that is, $MCS_X=3$ (the number of MCS level starts from 0).

If UE_A obtains the maximum MCS level $MCS_{max}$ and the minimum MCS level $MCS_{min}$ of the geographic area where it is currently located and assuming that $MCS_{min}10$ and $MCS_{min}=0$, the maximum available MCS level is 3 and the minimum available MCS level of UE_A is 0.

According to the size of the data packet to be sent, the UE_A selects, within the range of the available MCS level, the TBS value closest to the size of the data packet to be sent. Assuming that the size of the data packet to be sent is 300 bits, it may be seen in the following table-2, in the range of MCS0 to MCS3, the minimum TBS value greater than 300 bits is 328. Therefore, the TBS value is determined to be 328.

TABLE 2

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |

TABLE 2-continued

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |
| 26A | 632 | 1288 | 1928 | 2600 | 3240 | 3880 | 4584 | 5160 | 5992 | 6456 |

Assuming that the number of candidate physical resource blocks (PRBs) includes 6, 8, and 9, the criteria for the UE_A to select the number of PRBs for transmitting the data packet to be sent may be as follows.

1. Within the range of available MCS levels, the maximum number of PRBs that meet the TBS value may be used as the available physical resources. That is, the number of PRBs is selected as 9. In such a manner, the code rate is reduced and the transmission reliability may be improved most.

2. Within the range of available MCS levels, the minimum number of PRBs that meet the TBS value may be used as the available physical resources. That is, the number of PRBs is selected as 6. In such a manner, the occupation for physical resources is reduced and more users are allowed to be accommodated in the network.

The following are apparatus embodiments of the present disclosure, which can be used to implement the method embodiments of the present disclosure. For details that are not disclosed in the apparatus embodiments of the present disclosure, please refer to the method embodiments of the present disclosure.

Figure 9:
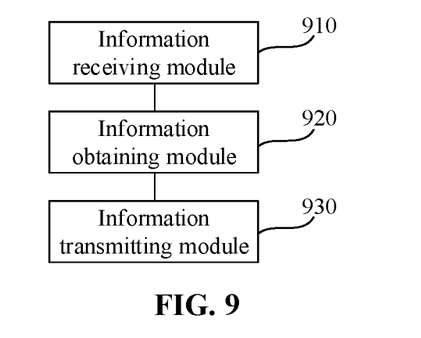
FIG. 9 is a block diagram showing an apparatus for transmitting information according to an embodiment.

FIG. 9 is a block diagram showing an apparatus for transmitting information according to an embodiment. The apparatus has the function of implementing the foregoing method example, and the function may be implemented by hardware, or may be implemented by hardware executing corresponding software. The apparatus may be applied in a terminal, such as the first terminal introduced above. The apparatus may include an information receiving module 910, an information obtaining module 920, and an information transmitting module 930.

The information receiving module 910 is configured to receive, through a direct interconnection communication interface for transmitting V2X services, target information sent by the second terminal on a target channel.

The information obtaining module 920 is configured to obtain measurement information corresponding to the target information, where the measurement information includes a measurement position and one or more measurement values, the measurement position is used to indicate a time-frequency position occupied by the target information, and the one or more measurement values are used to indicate channel quality of the target channel.

The information transmitting module 930 is configured to transmit the measurement information to the second terminal.

In conclusion, in the technical solutions provided by the embodiments of the present disclosure, after the first terminal receives the information sent by the second terminal on the direct interconnection communication interface, the measurement information corresponding to the information is obtained, and then the measurement information is transmitted to the second terminal. The measurement and feedback for the quality of channel between the terminals are implemented, and the improving of the transmission quality of the communication link established between the terminals based on the direct interconnection communication interface is reliably guaranteed.

In an embodiment provided based on the embodiment of FIG. 9, the information transmitting module 930 is specifically configured to transmit a message to the second terminal through a PSCCH, the message carrying the measurement information.

In one or more embodiments, the message further includes a first indication information, and the first indication information is used to indicate that the message carries the measurement information.

In another embodiment provided based on the embodiment of FIG. 9, the information transmitting module 930 is specifically configured to transmit the measurement information to the second terminal through the PSSCH.

In one or more embodiments, the measurement information occupies at least one RE of the first symbol of the PSSCH;

Or, the measurement information occupies m REs of first n symbols of the PSSCH, and both n and m are positive integers.

In another embodiment provided based on the embodiment of FIG. 9 or the foregoing embodiments, the apparatus further includes an activation detection module.

The activation detection module is configured to detect whether the second terminal has passed a PSCCH activation detection.

The information obtaining module 920 is further configured to obtain measurement information corresponding to the target information if the second terminal has passed the PSCCH activation detection.

In another embodiment provided based on the embodiment of FIG. 9 or the foregoing embodiments, a statistical granularity of the measurement information in a time domain includes any one of the following: at least one frame, at least one sub-frame, and at least one symbol.

In another embodiment provided based on the embodiment of FIG. 9 or the foregoing embodiments, the one or more measurement values include at least one of the following: CQI, RI, PMI, or RSRP.

It should be noted that, when the apparatus provided by the foregoing embodiments implement its functions, the division of the foregoing functional modules is only used as an example. In practical applications, the foregoing functions may be an achieved by different functional modules according to practical requirements. That is, the content structure of the apparatus is divided into different functional modules to complete all or part of the functions described above.

Regarding the apparatus in the foregoing embodiments, the specific manner in which each module performs operation has been described in detail in the embodiments of the method, and detailed description will not be given here.

An embodiment of the present disclosure also provides a terminal, which can implement the method for transmitting information provided by the present disclosure. The terminal includes a processor and a memory for storing instructions executable by the processor. The processor is configured to perform the following operations.

The target information sent by the second terminal on the target channel is received through the direct interconnection communication interface for transmitting V2X services.

Measurement information corresponding to the target information is obtained. The measurement information includes a measurement position and one or more measurement values, the measurement position is used to indicate a time-frequency position occupied by the target information, and the one or more measurement values are used to indicate the channel quality of the target channel.

The measurement information is transmitted to the second terminal.

In one or more embodiments, the processor is configured to perform the following operation.

A message is transmitted to the second terminal through the PSCCH, the message carrying the measurement information.

In one or more embodiments, the message further includes first indication information, and the first indication information is used to indicate that the message carries the measurement information.

In one or more embodiments, the processor is configured to perform the following operation.

The measurement information is transmitted to the second terminal through a PSSCH.

In one or more embodiments, the measurement information occupies at least one RE of the first symbol of the PSSCH.

Or, the measurement information occupies m REs of first n symbols of the PSSCH, and both n and m are positive integers.

In one or more embodiments, the processor is configured to perform the following operation.

Whether the second terminal has passed a PSCCH activation detection is detected.

In a case where the second terminal has passed the PSCCH activation detection, the measurement information corresponding to the target information is obtained.

In one or more embodiments, a statistical granularity of the measurement information in the time domain includes any one of the following: at least one frame, at least one sub-frame, at least one slot, and at least one symbol.

In one or more embodiments, the one or more measurement values include at least one of the following: CQI, RI, PMI or RSRP.

The foregoing mainly describes the solutions provided by the embodiments of the present disclosure at the terminal side. It can be understood that, in order to implement the foregoing functions, the terminal includes corresponding hardware structures and/or software modules for performing each function. In combination with the units and algorithm steps of the examples described in the embodiments disclosed in the present disclosure, the embodiments of the present disclosure may be implemented in the form of hardware or a combination of hardware and computer software. Whether a function is executed by the hardware or by the hardware driven by computer software depends on the specific application and design constraints of the technical solution. Those skilled in the art may use different methods for each specific application to implement the described functions, but the implementation should not be considered as going beyond the scope of the technical solutions of the embodiments of the present disclosure.

Figure 10:
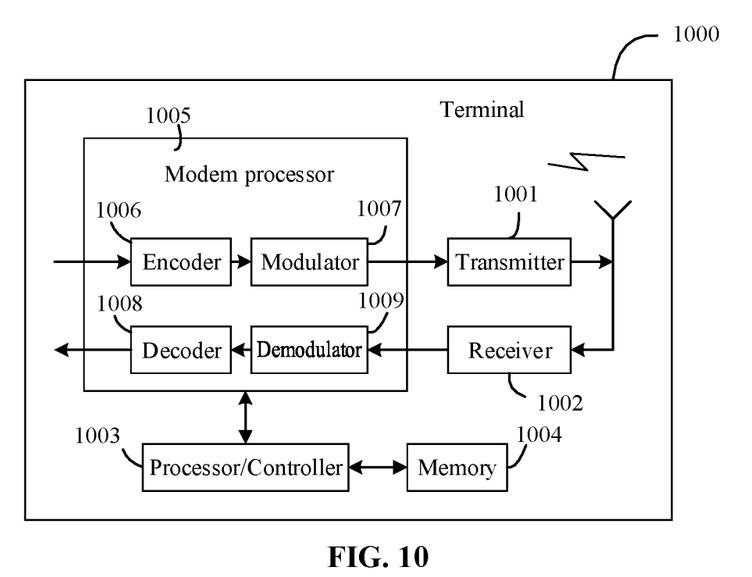
FIG. 10 is a schematic structural diagram showing a terminal according to an embodiment.

FIG. 10 is a schematic structural diagram of a terminal according to an embodiment.

The terminal 1000 includes a transmitter 1001, a receiver 1002 and a processor 1003. The processor 1003 may also be a controller, which is represented as "controller/processor 1003" in FIG. 10. In one or more embodiments, the terminal 1000 may further include a modem processor 1005, where the modem processor 1005 may include an encoder 1006, a modulator 1007, a decoder 1008, and a demodulator 1009.

In one example, the transmitter 1001 adjusts (for example, analog conversion, filtering, amplification, and up-conversion, etc.) the output samples and generates an uplink signal. The uplink signal is transmitted to the access network device via an antenna. In downlink, the antenna receives the downlink signal transmitted by the access network device. The receiver 1002 adjusts (for example, filters, amplifies, down-converts, and digitizes, etc.) the signal received from the antenna and provides input samples. In the modem processor 1005, the encoder 1006 receives service data and signalling messages to be transmitted in uplink, and processes the service data and signalling messages (for example, formatting, encoding, and interleaving). The modulator 1007 further processes (for example, symbol mapping and modulation) the encoded service data and signalling messages and provides output samples. The demodulator 1009 processes (e.g., demodulates) the input samples and provides symbol estimation. The decoder 1008 processes (for example, deinterleaves and decodes) the symbol estimation and provides decoded data and signalling messages sent to the terminal 1000. The encoder 1006, the modulator 1007, the demodulator 1009, and the decoder 1008 may be implemented by a synthesized modem processor 1005. These units perform processing according to the wireless access technology (for example, LTE and the access technology of other evolved systems) adopted by the wireless access network. It should be noted that when the terminal 1000 does not include the modem processor 1005, the foregoing functions of the modem processor 1005 may also be performed by the processor 1003.

The processor 1003 controls and manages the actions of the terminal 1000, and is configured to execute the processing procedure performed by the terminal 1000 in the foregoing embodiments of the present disclosure. For example, the processor 1003 is further configured to execute various steps on the terminal side in the foregoing method embodiments, and/or other steps of the technical solutions described in the embodiments of the present disclosure.

Further, the terminal 1000 may further include a memory 1004, and the memory 1004 is configured to store program codes and data for the terminal 1000.

The processor used to perform the functions of the foregoing terminal in the embodiments of the present disclosure may be a Central Processing Unit (CPU), a general-purpose processor, a Digital Signal Processor (DSP), and an Application-Specific integrated circuit (ASIC), Field Programmable Gate Array (FPGA) or other programmable logic devices, transistor logic devices, hardware components or any combination thereof. It can implement or execute various exemplary logical blocks, modules and circuits described in the disclosed contents of the embodiments of the present disclosure. The processor may also be a combination for implementing computing functions, for example, including a combination of one or more microprocessors, a combination of a DSP and a microprocessor, and the like.

The steps of the method or algorithm described in disclosed contents of the embodiments of the present disclosure may be implemented in a hardware manner, or may be implemented in a manner that a processor executes software instructions. Software instructions may be composed of corresponding software modules. The software modules may be stored in a Random Access memory (RAM), a flash memory, a Read Only Memory (ROM), and an Erasable Programmable Rom (EPROM), an Electrically EPROM (EEPROM), a register, a hard disk, a portable hard disk, a CD-ROM, or any other forms of storage media known in the art. An exemplary storage medium is coupled to the processor, so that the processor can read information from the storage medium and can write information into the storage medium. Of course, the storage medium may also be a component of the processor. The processor and the storage medium may be located in the ASIC. In addition, the ASIC may be located in the terminal. Of course, the processor and the storage medium may also exist in the terminal as discrete components.

Those skilled in the art should be aware that in one or more of the foregoing examples, the functions described in the embodiments of the present disclosure may be implemented by hardware, software, firmware, or any combination thereof. When implemented by software, these functions can be stored in a computer-readable medium or transmitted as one or more instructions or codes in the computer-readable medium. Computer readable medium includes computer storage media and communication media. The communication medium includes any medium that facilitates the transfer of computer programs from one place to another. The storage medium may be any available medium that can be accessed by a general-purpose or special-purpose computer.

The embodiments of the present disclosure also provide a non-transitory computer-readable storage medium in which computer programs are stored, and when the computer programs are executed by a processor, the steps of the method for transmitting information described above are implemented.

The technical solutions provided by the embodiments of the present disclosure may include the following beneficial effects.

In the technical solutions provided by the embodiments of the present disclosure, after the first terminal receives, through the direct interconnection communication interface, the information sent by the second terminal, the measurement information corresponding to the information is obtained. Then the above measurement information is sent to the second terminal. The measurement and feedback for the quality of channel between terminals are implemented, and the improving of the transmission quality of the communication link established between the terminals based on the direct interconnection communication interface is reliably guaranteed.

It should be understood that the "plurality" mentioned herein refers to two or more. "And/or" describes the association relationship of the associated objects, indicating that there may be three types of relationships. For example, A and/or B, which may mean the following three cases: A exists alone, A and B exist at the same time, and B exists alone. The character "/" generally indicates that the associated objects are in an "or" relationship.

Other embodiments of the disclosure will readily occur to those skilled in the art upon consideration of the specification and practice of the disclosure disclosed herein. The disclosure is intended to cover any variations, uses, or adaptive changes of the disclosure. These variations, uses, or adaptive changes follow the general principles of the disclosure and include common general knowledge or conventional technical means in the technical field, which are not disclosed herein. The specification and the embodiments are considered as being exemplary only, with a true scope and spirit of the disclosure being indicated by the following claims.

It should be understood that the disclosure is not limited to the exact construction that has been described above and illustrated in the accompanying drawings, and that various modifications and changes can be made without departing from the scope thereof. The scope of the present disclosure is limited only by the appended claims.

What is claimed is:

1. A method for transmitting information, comprising:
    directly receiving, by at least one first terminal through a direct interconnection communication interface for transmitting Vehicle to Everything (V2X) services, target information sent by a second terminal in a broadcast manner on a target channel;
    obtaining, by the at least one first terminal, at least one piece of measurement information respectively, each of the at least one piece of measurement information corresponding to the target information, wherein each of the at least one piece of measurement information comprises a measurement position and one or more measurement values, the measurement position is used to indicate a time-frequency position occupied by the target information, and the one or more measurement values are used to indicate channel quality of the target channel;
    transmitting, by the at least one first terminal, the at least one piece of measurement information to the second terminal respectively;
    receiving, by the second terminal, the at least one piece of measurement information from the at least one first terminal;
    obtaining, by the second terminal, the one or more measurement values comprised in each of the at least one piece of measurement information;
    determining, by the second terminal, quality parameter of the target channel used for transmitting the target information according to the one or more measurement values;
    determining, by the second terminal, a maximum available Modulation and Coding Scheme (MCS) level corresponding to the target channel according to the quality parameter of the target channel;
    selecting, by the second terminal according to a data volume of information to be sent on the target channel, a transport block size (TBS) value, closest to the data volume of the information to be sent, within a range of the maximum available MCS level;
    determining, by the second terminal, a number of physical bearers used for transmitting the information to be sent according to the TBS value; and
    transmitting, by the second terminal, the information to be sent according to the number of the physical bearers.

2. The method according to claim 1, wherein transmitting, by the first terminal, the measurement information to the second terminal comprises:
    transmitting, by the first terminal, a message to the second terminal through a Physical Sidelink Control Channel (PSCCH), wherein the message carries the measurement information.

3. The method according to claim 2, wherein the message further comprises first indication information, and the first indication information indicates that the measurement information is carried in the message.

4. The method according to claim 1, wherein transmitting, by the first terminal, the measurement information to the second terminal comprises:
    transmitting, by the first terminal, the measurement information to the second terminal through a Physical Sidelink Shared Channel (PSSCH).

5. The method according to claim 4, wherein
the measurement information occupies at least one Resource Element (RE) of a first symbol of the PSSCH; or
the measurement information occupies m REs of first n symbols of the PSSCH, and both n and m are positive integers.

6. The method according to claim 5, further comprising:
detecting, by the first terminal, whether the second terminal has passed a PSCCH activation detection; and
in response to determining that the second terminal has passed the PSCCH activation detection, obtaining, by the first terminal, the measurement information corresponding to the target information.

7. The method according to claim 5, wherein a statistical unit of the measurement information in a time domain comprises any one of the following parameters: at least one frame, at least one sub-frame, at least one slot, and at least one symbol.

8. The method according to claim 5, wherein the one or more measurement values comprise at least one of the following parameters: Channel Quality Indicator (CQI), rank indication (RI), Precoding Matrix Indicator (PMI), and Reference Signal Receiving Power (RSRP).

9. A system, comprising:
at least one first terminal; and
a second terminal,
wherein the at least one first terminal is configured to:
directly receive, through a direct interconnection communication interface for transmitting Vehicle to Everything (V2X) services, target information sent by the second terminal in a broadcast manner on a target channel;
obtain at least one piece of measurement information respectively, each of the at least one piece of measurement information corresponding to the target information, wherein each of the at least one piece of measurement information includes a measurement position and one or more measurement values, the measurement position is used to indicate a time-frequency position occupied by the target information, and the one or more measurement values are used to indicate channel quality of the target channel; and
transmit the at least one piece of measurement information to the second terminal respectively;
wherein the second terminal is configured to:
receive the at least one piece of measurement information from the at least one first terminal;
obtain the one or more measurement values comprised in each of the at least one piece of measurement information;
determine quality parameter of the target channel used for transmitting the target information according to the one or more measurement values;
determine a maximum available Modulation and Coding Scheme (MCS) level corresponding to the target channel according to the quality parameter of the target channel;
select, according to a data volume of information to be sent on the target channel, a transport block size (TBS) value, closest to the data volume of the information to be sent, within a range of the maximum available MCS level;
determine a number of physical bearers used for transmitting the information to be sent according to the TBS value; and
transmit the information to be sent according to the number of the physical bearers.

10. The system according to claim 9, wherein the at least one first terminal is configured to transmit a message to the second terminal through a Physical Sidelink Control Channel (PSCCH), wherein the measurement information is carried in the message.

11. The system according to claim 10, wherein the message further comprises first indication information, and the first indication information indicates that the measurement information is carried in the message.

12. The system according to claim 9, wherein the at least one first terminal is configured to transmit the measurement information to the second terminal through a Physical Sidelink Shared Channel (PSSCH).

13. The system according to claim 12, wherein
the measurement information occupies at least one Resource Element (RE) of a first symbol of the PSSCH; or
the measurement information occupies m REs of first n symbols of the PSSCH, and both n and m are positive integers.

14. The system according to claim 9, wherein the at least one first terminal is further configured to:
detect whether the second terminal has passed a PSSCH activation detection; and
wherein the at least one first terminal is further configured to obtain the measurement information corresponding to the target information in response to determining that the second terminal has passed the PSSCH activation detection.

15. The system according to claim 9, wherein a statistical unit of the measurement information in a time domain comprises any one of the following parameters: at least one frame, at least one sub-frame, at least one slot, and at least one symbol.

16. The system according to claim 9, wherein the one or more measurement values comprise at least one of the following parameters: Channel Quality Indicator (CQI), rank indication (RI), Precoding Matrix Indicator (PMI), and Reference Signal Receiving Power (RSRP).

17. A non-transitory computer-readable storage medium for storing computer programs, and when the computer programs are executed by at least one first terminal and a second terminal, the at least one first terminal is configured to perform:
directly receiving, through a direct interconnection communication interface for transmitting Vehicle to Everything (V2X) services, target information sent by the second terminal in a broadcast manner on a target channel;
obtaining at least one piece of measurement information respectively, each of the at least one piece of measurement information corresponding to the target information, wherein each of the at least one piece of measurement information comprises a measurement position and one or more measurement values, the measurement position is used to indicate a time-frequency position occupied by the target information, and the one or more measurement values are used to indicate channel quality of the target channel; and
transmitting the at least one piece of measurement information to the second terminal respectively;
wherein the second terminal is configured to perform:
receiving the at least one piece of measurement information from the at least one first terminal;

obtaining the one or more measurement values comprised in each of the at least one piece of measurement information;

determining quality parameter of the target channel used for transmitting the target information according to the one or more measurement values;

determining a maximum available Modulation and Coding Scheme (MCS) level corresponding to the target channel according to the quality parameter of the target channel;

selecting, according to a data volume of information to be sent on the target channel, a transport block size (TBS) value, closest to the data volume of the information to be sent, within a range of the maximum available MCS level;

determining a number of physical bearers used for transmitting the information to be sent according to the TBS value; and transmitting the information to be sent according to the number of the physical bearers.

18. The non-transitory computer-readable storage medium according to claim 17, wherein transmitting the measurement information to the second terminal comprises:

transmitting a message to the second terminal through a Physical Sidelink Control Channel (PSCCH), wherein the message carries the measurement information.

19. The non-transitory computer-readable storage medium according to claim 18, wherein the message further comprises first indication information, and the first indication information is used to indicate that the measurement information is carried in the message.

20. The non-transitory computer-readable storage medium according to claim 17, wherein transmitting the measurement information to the second terminal comprises:

transmitting the measurement information to the second terminal through a PSSCH.

\* \* \* \* \*